US011086696B2

(12) United States Patent
Vaishnav et al.

(10) Patent No.: US 11,086,696 B2
(45) Date of Patent: Aug. 10, 2021

(54) PARALLEL CLONED WORKFLOW EXECUTION

(71) Applicant: Microsoft Technology Licensing, LLC, Redmond, WA (US)

(72) Inventors: Sunay Vaishnav, Seattle, WA (US); Eldon Cornelio, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/528,863

(22) Filed: Aug. 1, 2019

(65) Prior Publication Data

US 2021/0034439 A1 Feb. 4, 2021

(51) Int. Cl.
*G06F 9/54* (2006.01)
*G06F 9/38* (2018.01)
*G06F 11/36* (2006.01)

(52) U.S. Cl.
CPC ............ *G06F 9/542* (2013.01); *G06F 9/38* (2013.01); *G06F 11/3688* (2013.01)

(58) Field of Classification Search
None
See application file for complete search history.

(56) References Cited

U.S. PATENT DOCUMENTS

| 7,483,902 | B2 | 1/2009 | Ghai et al. |
| 8,990,778 | B1 * | 3/2015 | Allocca |
| 9,329,915 | B1 * | 5/2016 | Chandrasekharapuram |
| 9,417,895 | B2 | 8/2016 | Safari et al. |
| 2009/0150885 | A1 | 6/2009 | Safari et al. |
| 2012/0011239 | A1 | 1/2012 | Svane et al. |
| 2015/0039382 | A1 | 2/2015 | Kim |
| 2019/0034320 | A1 | 1/2019 | Stokes |

FOREIGN PATENT DOCUMENTS

| CN | 1399218 A | 2/2003 |
| CN | 107480040 A | 12/2017 |

OTHER PUBLICATIONS

Beebe, et al., "Test your Flow by using Example Data", Retrieved from: https://docs.microsoft.com/en-us/business-applications-release-notes/april18/microsoft-flow/test-flow-using-sample-data, Sep. 7, 2018, 2 Pages.

(Continued)

*Primary Examiner* — Syed A Roni
(74) *Attorney, Agent, or Firm* — Buckley, Maschoff & Talwalkar LLC (57) ABSTRACT

Provided is a system and method which enables a workflow to be tested while keeping the workflow active by cloning a copy of an underlying job and executing the cloned job in parallel with the underlying job. In one example, the method may include executing an original job on data in a production environment, where the original job comprises machine-readable code of a predefined flow, in response to receiving a simulation request, creating a clone of the original job which comprises an independent execution state from the original job, executing the cloned job for a limited number of runs on one or more events, and storing the processing results of the cloned job.

18 Claims, 7 Drawing Sheets

(56) References Cited

OTHER PUBLICATIONS

Stern, Hannah, "How to Clone an Existing Workflow", Retrieved from: https://support.bettercloud.com/hc/en-us/articles/115001347414-How-To-Clone-an-Existing-Workflow, May 1, 2019, 2 Pages.

"Managing Workflow", Retrieved from: https://www.zoho.com/campaigns/help/marketing-automation/workflow/manage-workflows.html#clone, Retrieved Date: Jul. 2, 2018, 5 Pages.

Peterson-New, Ethan, "How to Test a Workflow", Retrieved from: https://support.bettercloud.com/hc/en-us/articles/219633067-How-to-Test-a-Workflow, May 1, 2019, 3 Pages.

"Test and Debug", Retrieved from: https://www.zoho.com/flow/help/test-and-debug.html, Retrieved Date: Jul. 2, 2018, 2 Pages.

Landrum, Greg, "Enter the Era of Automated Workflow Testing and Validation", Retrieved from: https://www.knime.com/blog/enter-the-era-of-automated-workflow-testing-and-validation, Jun. 25, 2018, 7 Pages.

"How to Test your Workflow", Retrieved from: https://knowledge.hubspot.com/workflows-user-guide-v2/how-to-test-your-workflow, Retrieved Date: Oct. 16, 2018, 5 Pages.

Patin, Lindsey "Testing a Workflow", Retrieved from: https://support.iterable.com/hc/en-us/articles/208246653-Testing-a-Workflow, Retrieved Date: Oct. 16, 2018, 8 Pages.

"International Search Report and Written Opinion Issued in PCT Application No. PCT/US20/037100", dated Sep. 11, 2020, 11 Pages.

* cited by examiner

PARALLEL CLONED WORKFLOW EXECUTION

BACKGROUND

A workflow application is used to automate computing tasks which are often part of a larger business process. A simple example of a workflow may involve creating and sending a customized email to a particular user each time a new file is stored at a flagged storage location. Workflow applications can integrate or otherwise work with hundreds of other applications from enterprise resource planning (ERP) applications, word processing applications, email applications, meeting applications, and the like. When a triggering event is received, an automated workflow can process the event using a predefined job (executable code) until the event is completed. Jobs are repetitive and performed in the same manner each time a new trigger event is received/detected.

When a new workflow is created or an existing workflow is changed, the workflow (and the underlying job) should be tested to determine whether the workflow will operate as intended. Testing usually requires an isolated test environment with separate storage and access requirements in order to isolate the test process from a production environment. In this scenario, a developer must create a first version of the software that is compatible with the test environment in order to test the code, and a second version of the software that is compatible with the production environment for live execution. This may be time consuming.

DETAILED DESCRIPTION

The following description is provided to enable any person in the art to make and use the described embodiments. Various modifications, however, will remain readily-apparent to those in the art.

When a system (e.g., a workflow application, etc.) creates a workflow, behind the scenes a framework creates a job that carries out the steps of the workflow on a computer. In other words, the job represents the sequence of steps of the workflow in machine-readable form. The job typically starts with a trigger event (e.g., a new email is received, etc.). In this example, the job may carry out a set of processing actions each time a new email is received (e.g., if an email is from my boss, put the email into a special folder, etc.) Once the system activates a workflow, the system will continuously process the job and check for the triggering event. In the example of the email, the system continues to check for receipt of new emails and whether the condition (sender=boss) is met.

Automatically triggered workflows by a workflow application are backed by a job execution engine that tracks the trigger state. The engine can schedule a job for processing on an available computing platform such as a web server, a cloud platform, a virtual machine, or the like. Once a job is configured and set up to process events, each time a new event occurs, the job marks the event as seen and processes the event, subsequently running the underlying job of the workflow.

A workflow application may provide template workflows. Users often start with these templates and make changes to the standard workflows to create something customized to their needs. As another example, users may desire to go back in time and process some old events that occurred before a workflow was set up, or rerun a workflow on some events due to failures in execution. The example embodiments create a clone of a job with its own state and runtime lifecycle. The clone can be run a limited number of times and then terminated. The limited number of runs may be one run, two runs, or any predetermined number of runs. To implement the limited number of run(s), a job execution engine which schedules the run may tag the run with a limited execution number e.g., once, instead of tagging the run to execute indefinitely. The clone can run in parallel to the original job to which the clone corresponds, enabling new events to be processed and old events to be tested in parallel. The creation of the clone allows for testing of changes to a job, rerunning previous events, processing old events (sometimes for a second time), and the like.

For example, a user may make a change to a workflow resulting in a push notification being sent to their device in response to receiving an email from a friend. The change may be saved to the live environment and also cloned at the same time. For example, the user may push a button for "save and test", etc. By cloning the resulting job, the system can execute the cloned job on a previously received email instead of waiting for a new email from the friend. In other words, the user can test out the changes made to the job by cloning the job and testing the changes on one or more historical events that are relevant. Otherwise, the user would have to wait for the friend to send an email. Furthermore, should a live email come through from the friend, the saved/live job is also running and can therefore process the email in real-time. Thus, there is no downtime for the workflow execution.

Once activated, a running job remains unchanged. As a result, the workflow processing is consistent across all events coming through. When a user wants to make a change to the workflow (causing a corresponding change in the job), the user must turn off the active job, and make/test changes to the code in a test mode. This enables the user to ensure the changes work properly before the code is once again activated.

According to various embodiments, however, changes to a workflow can be tested without the need to turn off an active job or enter into a testing mode. To achieve this, the framework can create a clone of a job that runs a limited number of times and terminates. For example, the framework may create a clone that can pick up a historical event which can be tested against, and run the cloned job for test purposes. As soon as the cloned job is done, the cloned job may be terminated and cleaned up so that the cloned job does not interfere with the corresponding active job. At the same time, the original job that is subject to the clone may operate on live data. Therefore, if new events come through that trigger the job, the job can still process the new events at the same time (in parallel) with the cloned job executing the historical event. This allows the user to both make changes and test them at the same time without any downtime. In other examples, the cloned job may be configured to operate on a limited number of future events . . . .

In some embodiments, the framework may also process partial runs or halfway runs without processing a full run. In this example, the job may execute only a subset of the steps of a workflow rather than the entire set of steps. For example, a workflow may include 10 steps. An event may be processed by the underlying job and may stop at step 5 and fail. In this case, the failed event is stored by the workflow software. When a user makes a change to the workflow and saves the workflow, the user may also test the workflow on old events, even those events which did not complete. Therefore, the user may test the workflow on the failed event from the point in the workflow where the event failed. In the example above, the user may test the workflow from step 5 to step 10, rather than test all of the steps (1-10). Thus, the framework allows for partial runs of the job to be performed.

As another example, the system may enable the user to execute only parts of a flow. For example, the system could output a user interface which allows a user to configure certain actions of a workflow to be disabled or use "mock" data during a "test" run. In this example, the cloning would be based on the per action configuration instead of the original workflow configuration. This allows a user to run only few parts of the flow when in "test mode." For example, a workflow may send an email to a large distribution list as part of the actions the workflow takes. When testing this flow, the user may not want to send the email and can thus disable the email action from being executed. In this case, the user interface may provide the user with an option to disable the send email action during test. When the underlying job is cloned, the workflow will function normally but will not execute the send email action because the send email action has been disabled.

One workflow typically has one job. In the example embodiments, the workflow is implemented with a consistent production level job, and a shadow clone of that job can be run once and terminate immediately. Accordingly, there is no overlap or downtime in production workload and at the same time, a user can test run changes to the job while continuing to process any incoming events without interruption. Furthermore, there is no need for a test environment and a user does not need to make a manual copy of anything, or create test data. The framework can create a clone job in a production or live environment which can process old events without any worry about the previous events being redundantly processed.

The framework may continue to use the job types that have been used by workflow executions (trigger-based executions) with some differences. For example, the framework may ensure that the cloned jobs are completed after a limited number of run(s) or a partial run, so that the cloned job is deleted thereafter. This can be achieved by creating jobs without a repeat strategy in the simulation context. For example, the job execution engine may assign a tag that specifies the job is to execute for a limited number of runs, instead of continuously/indefinitely as with the original run. Furthermore, the framework may ensure that cloned job ID's are prepended with a tag, for example, 'Flow Simulate Trigger Job' or the like, to help identify cloned jobs on the system. As another example, the framework may add a header, for example, 'x-operation-context' for all outgoing calls when the cloned simulation job is running which identifies the action as a test action or simulated action, and not a live action.

Figure 1:
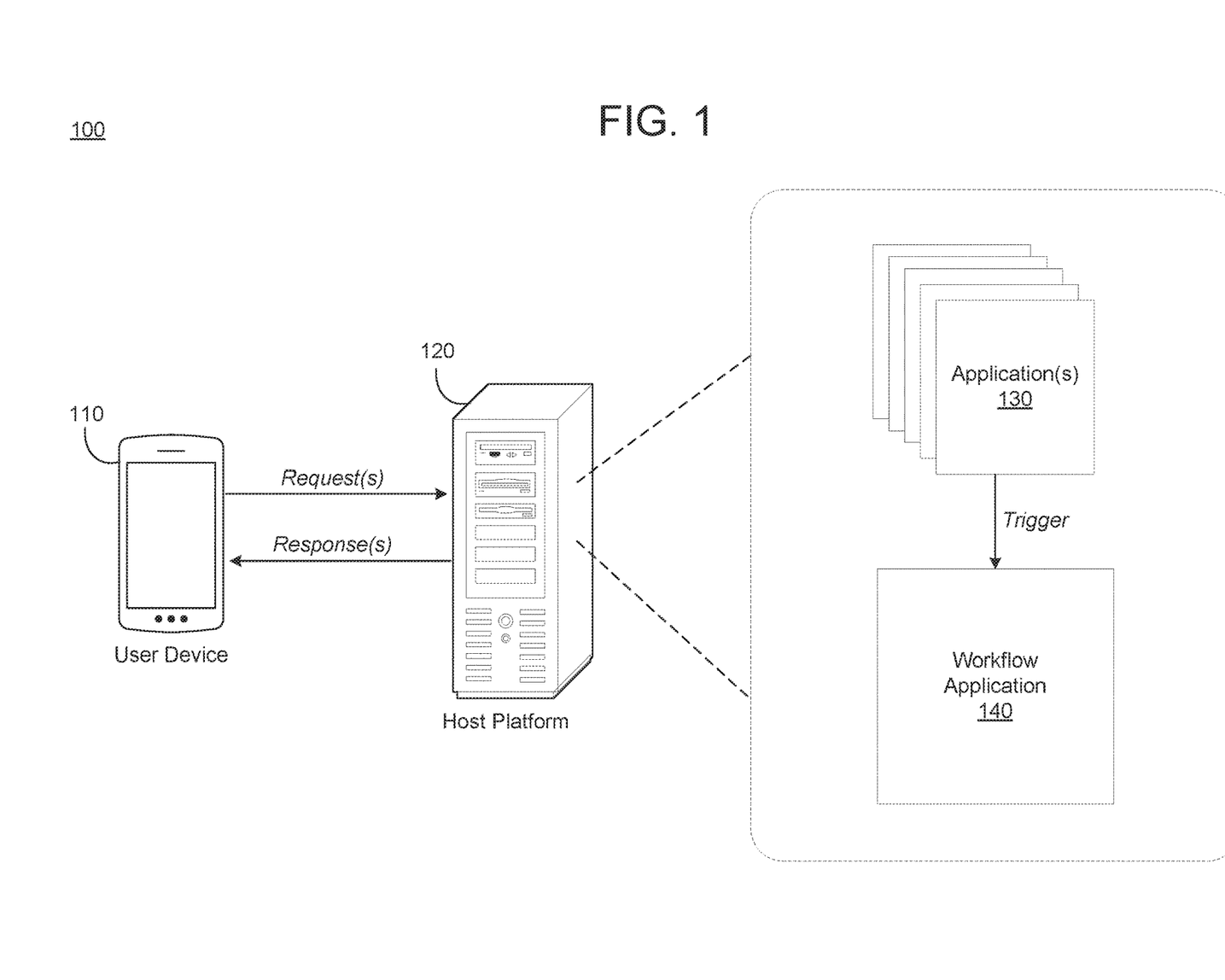
FIG. 1 is a diagram illustrating a computing environment for parallelized execution of a workflow according to some embodiments.

FIG. 1 illustrates a computing environment 100 for parallelized execution of an automated workflow according to some embodiments. Referring to FIG. 1, the computing environment 100 includes a user device 110 and a host platform 120 which may be connected to each other via a network such as the Internet, private network, or the like. The user device 110 may include a mobile phone, a tablet, a laptop, a desktop, a smart-wearable device, and the like. The host platform 120 may include a web server, a cloud computing platform, a database, an on-premises server, and the like.

Figure 2:
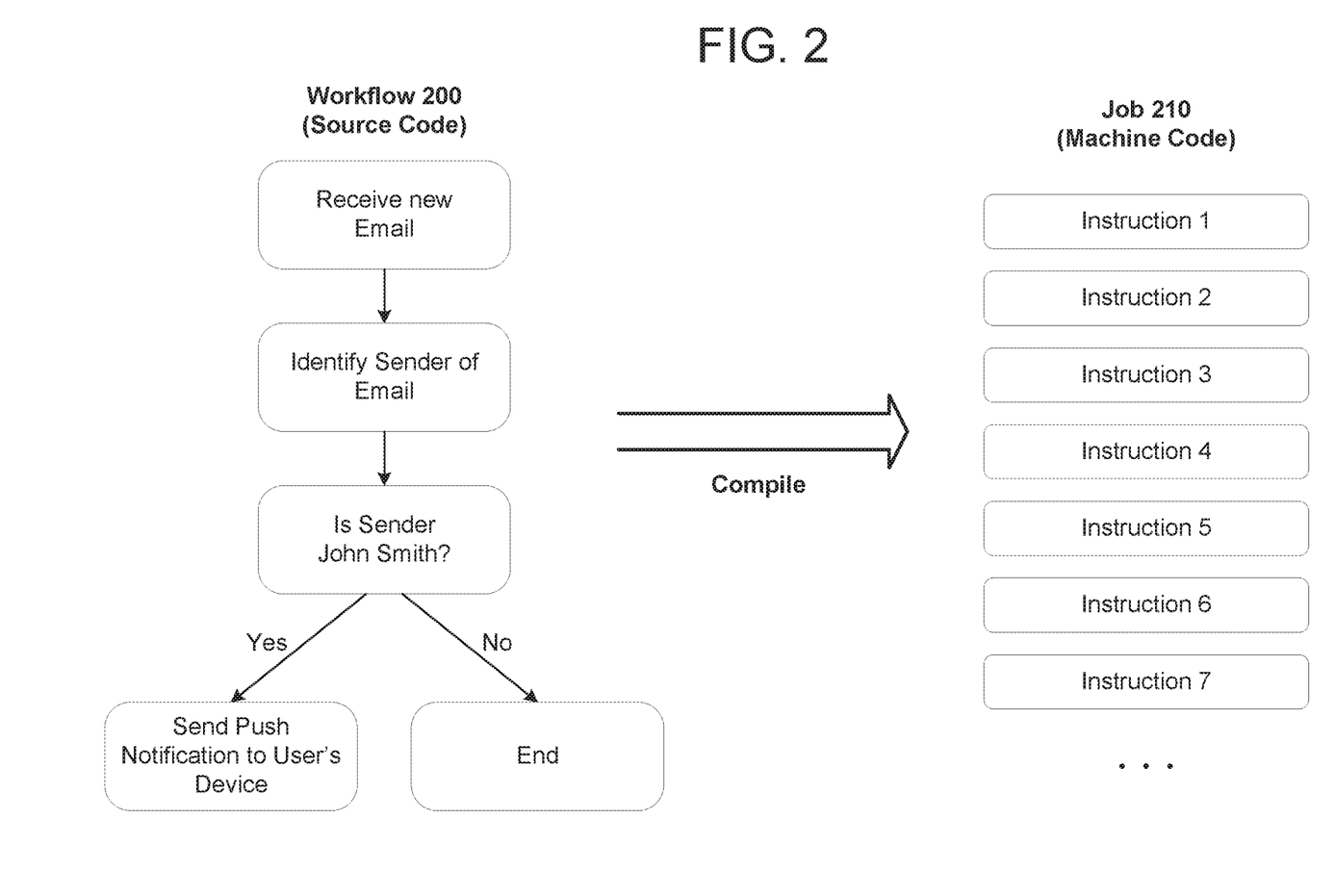
FIG. 2 is a diagram illustrating a workflow and a corresponding job for executing the workflow according to some embodiments.

In the example of FIG. 1, the host platform 120 may host a workflow application 140 which can generate automated workflows, examples of which are provided in the description of FIG. 2. The host platform 120 may also host or otherwise communicate with applications 130 which can be part of workflows created by the workflow application 140. Here, the workflow application 140 can create workflows that interact with one or more of the applications 130. For example, the applications 130 can include email applications, messaging applications, meeting applications, document preparing applications, note-taking applications, storage applications, and the like. In some embodiments, the applications 130 may include ERP-based applications, but embodiments are not limited thereto. The workflow application 140 may interact with application programming interfaces (APIs) of the applications 130 to retrieve any data needed for the workflow.

According to various embodiments, a user via user device 110 may set up a workflow through workflow application 140 using operating features from one or more applications 130. Once generated, the workflow can process incoming events based on data being received by the user device 110, the host platform 120, the applications 130, and/or the workflow application 140. When a user desires to make a change to the workflow, the user may be provided with a user interface (e.g., shown in FIG. 4A) by the workflow application 140, which allows the user to test the changes to the workflow using previous events processed by the workflow application 140. The previous events may be stored on the host platform 120, the user device 110, or the like.

When the user desires to make a change to a workflow hosted by the workflow application 140, the user may create changes causing changes to the underlying job which is used to execute the workflow. Rather than test out the changes in a test environment, the user may select to test the workflow (and the underlying job) in the production environment. To implement the test, the workflow application 140 may generate a cloned job of the workflow, execute the cloned job against previous events, and terminate the cloned job after a predetermined number of runs. Meanwhile, the original job that is being cloned/tested, may simultaneously operate on the host platform 120. Therefore, the production job with the changes therein may start operating but it may take time before a triggering event comes in to test out the job. Therefore, the user may expedite the process by testing the job on one or more previous events. As another example, the user may want to rerun a previous job or process an event that was received prior to the workflow instead of testing out a new change to a workflow. In any of these use cases, the cloned job can be used.

FIG. 2 illustrates a workflow 200 and a corresponding job 210 for implementing the workflow 200 according to some embodiments. Here, the workflow 200 consists of source code which is abstractly represented with text. In this case, the workflow is triggered each time a new email is received and includes sending a push notification to the user's device when the sender is the user's boss John Smith. The source code may include human-generated code that is created using a programming language in one or more development environments. Meanwhile, a workflow application may compile the source code of the workflow 200 to create the job 210 which is the machine-readable code corresponding to the source code of the workflow 200. There are many possible workflows. In some cases, a workflow application may provide collection of template workflows, and a user may configure the template or otherwise customize the template based on their needs. In other examples, users may be able to design their own custom workflows. Other examples of workflows include, but are not limited to:

Save email attachments to Cloud Storage
Request approval when a new storage item is added
Receive a push notification when a new email is received from a specific user
Receive email updates from a blog
Receive an email with a list of tasks that are due each day
Get daily weather reports delivered to your phone
Send a push notification with my current location
Create a task when an email is flagged
Request a manger approval for a selected file
receive a daily digest of top news reports from a website
Copy new events to a calendar application
Receive daily email reminders
Post messages to a meeting application when a new task is created in a planner
Send approval email and follow up via email
Copy files between a personal drive and a shared drive
Send a working from home email
Block out my calendar application for a period of time
Create a to-do item for important emails
Copy email contacts to another application
Run a custom action when a specific mobile button is selected
Post a photo to a website timeline
Run analysis on emails and push results to a dataset In the example of FIG. 2, the workflow 200 is pre-complied code or source code that is written by developers (human readable code). In the example of FIG. 2, for simplicity, the code modules are explained as the functions they perform (e.g., identify sender of email, etc.) When the workflow code gets compiled, the workflow code is converted into machine readable code (the job 210) which is then deployed into action on one or more computing systems. Here, the workflow 200 represents the workflow definition and the job 210 is the logic that is running after compiling the code that creates a job on the computer.

A workflow application or software (e.g., workflow application 140 in FIG. 1) may provide a workflow automation service that allows users to create workflow routines without having to write code. These routines can be used to perform tasks (e.g., whenever a user receives an email from their boss, send the user a push notification). The logic can be used across hundreds of different applications where routines can be created. Here, a job is essentially a smallest unit of work that a workflow does. To go further, a job is a collection of API calls that get executed by the system.

Figure 3:
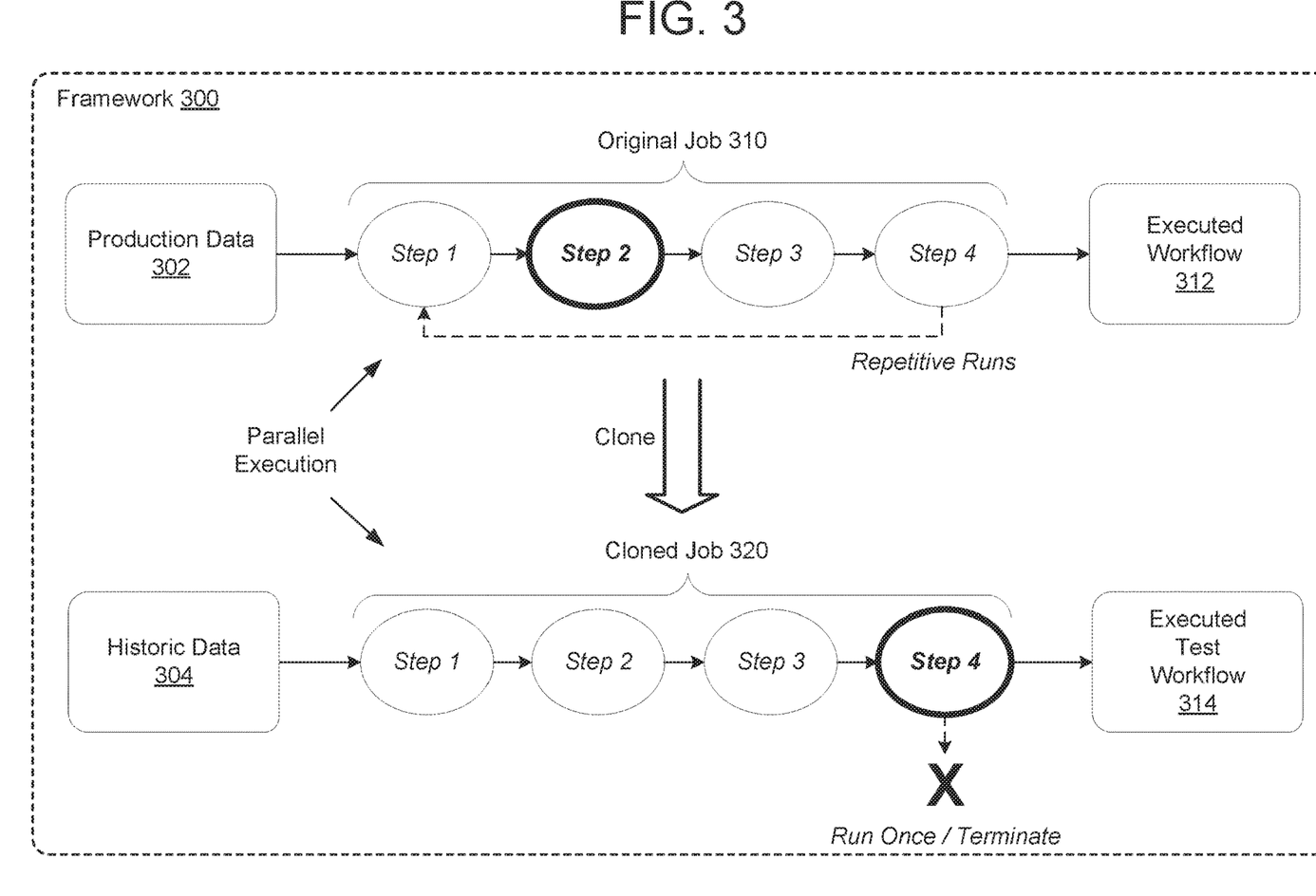
FIG. 3 is a diagram illustrating a framework for cloning a job which to be executed in parallel with the original job according to some embodiments.

FIG. 3 illustrates a framework 300 for creating a cloned job 320 from an original job 310 where the cloned job 320 can be executed in parallel with the original job 310 according to some embodiments. For example, the framework 300 may integrated within a workflow software or as an update or an add-on, etc. The framework 300 may include a job execution engine (not shown) which schedules execution of an original job 310 on a hardware system such as a server, a cloud platform, a virtual machine, a user device, and/or the like. In the example of FIG. 3, the original job 310 represents an active job that is running within the framework 300. The original job 310 includes four steps in this example (steps 1-4). Here, the original job 310 is triggered by events that occur in a production environment which includes production data 302.

According to various embodiments, a user may choose to test or otherwise simulate a workflow (e.g., the processing action of the corresponding original job 310) on historical events. In other words, the user may choose to initiate the processing of the original job 310 on non-active or non-production data but rather historic data 304 which has already been processed before by the original job 310 or which has not been processed by the original job 310 (e.g., they were stored before the original job 310 was implemented). In this example, the user may select to simulate or test the workflow. In response, the framework 300 may create the cloned job 320 behind the scenes which includes the same steps 1-4 as the original job 310. The user may be unaware of the existence of the cloned job 320, because to the user it may appear as if the same job is executing the historic data 304. However, the framework 300 does not allow for active jobs to be modified to process the historic data 304.

In this example, the cloned job 320 may be isolated from the original job 310 and the cloned job 320 may have its own state that is independent of the state of the original job 310. In other words, execution of the cloned job 320 may be separately performed from the original job 310. Accordingly, both the original job 310 and the cloned job 320 may run in parallel with one another. For example, the original job 310 may receive a new triggering event and process the new event accordingly, while the cloned job 320 is simultaneously processing historic data 304. To demonstrate this capability, in FIG. 3, the original job 310 is currently executing the second step (step 2) of the process on production data 302 while the cloned job 320 is currently executing the fourth step (step 4), in parallel, on the historic data 304. The results of the original job 310 are stored as executed workflow 312 and the results of the cloned job 320 are stored as executed test workflow 314. These corresponding results 312 and 314 may be stored in a storage and made accessible to the user via an application, the workflow application, the user's device, or the like.

For example, after the testing is completed, the results of the executed test flow 314 may be stored in a log file which provides the user with an understanding of whether the run was a success, a failure, or the like. The log may include test runs on historic data, test runs run on live data, and live runs run on live data, and the like. The log may identify whether the event was a test event, a live event, whether the event passed or failed, and other information. The log may be opened and viewable to a user within a user interface that provides the user with actions. For example, the actions may include allowing the user to view the results and/or errors that occurred during the testing which might lead to further runs of the first cloned job or a new cloned job, allowing the user to replace the original job, and/or other actions. In addition, if the user performs incremental testing, they may wait until a first portion of a workflow tests successfully, until testing the entirety or a second portion of the workflow, etc. The log of run information may be stored in the workflow application. As another example, the log of run information may be stored on a local file of the user's device, etc.

Furthermore, by enabling the user to see the test results as they occur, the user may quickly make additional changes to the workflow to correct any inconsistencies or bugs. When the user has reached a point where they are satisfied with the testing, the user may not need to take any additional action since the tested job is the same as the original job. In other words, the user may simply allow the currently active job to remain active without having to swap out a job with a successfully tested job from a test environment, etc.

As an example, a user may choose to run their workflow on historical data 304. For example, the user may create a new workflow or make changes to an existing workflow. The resulting workflow is executed by the original job 310. Rather than shut down the original job 310 for testing, the framework 300 may keep the original job 310 in an active state such that if new events come in, the original job 310 can still process them. In addition, the framework 300 can create the cloned job 320 which allows the user to select a specific historical event to test. The cloned job 320 can be executed on the historical data 304, and then the cloned job 320 may be terminated. In this example, the cloned job 320 runs once and then terminates. It should be appreciated that the cloned job 320 may run at least once or more than once up to a predetermined number of times, and then terminate. As another example, the cloned job 320 may run a partial run or a partial workflow rather than an entire workflow.

The benefits of the cloning process provided by the framework 300 of the workflow application include allowing a user to test data on-demand and without having to wait for a new event to trigger the test. In addition, the workflow can continue to process live events while the user can simultaneously simulate the workflow on historical events in parallel. The system can terminate the cloned job preventing the cloned job from interfering with its corresponding original job.

Referring again to FIG. 2, the user creates a workflow 200 which sends a push notification to their mobile device each time their boss sends them an email. Here, the user may create the new workflow 200 and then make the new workflow 200 an active workflow causing the job 210 to be running in the framework. However, the user will not be able to test the workflow until the next time their boss sends them an email. According to various embodiments, the user can select to test their workflow immediately based on a previous event (e.g., a previous email from their boss, etc.). The system can trigger the workflow (cloned job) to process the previous event (boss's email) and generate results enabling the user to know right away whether their workflow is going to work, or whether changes need to be made. Here, assuming the workflow is correct, the previous email from the user's boss may be processed by the cloned job causing a push notification to be sent to the user's device even though a new email has not been received from the user's boss.

Figure 4A:
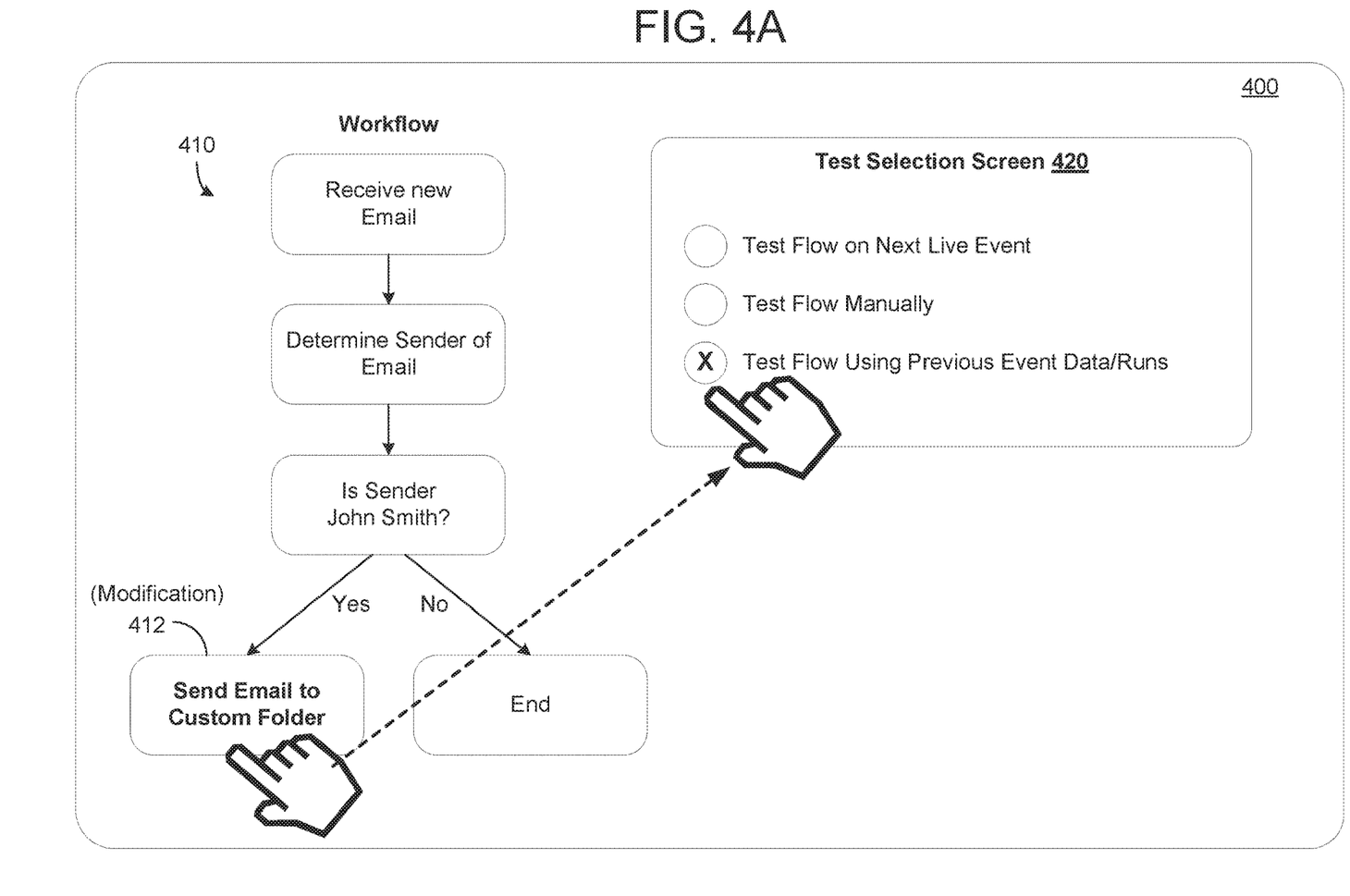
FIG. 4A is a diagram illustrating a user interface for modifying a workflow and testing the modified workflow according to some embodiments.

FIG. 4A illustrates a user interface 400 for modifying a workflow and testing the modified workflow according to some embodiments. Referring to FIG. 4A, the user has implemented a modification 412 to a workflow 410. Such changes made to the workflow 410 may be saved as a new workflow 410 by the workflow application. When saved, the workflow 410 may be active and running thereby awaiting a next triggering event (email). In addition, the user interface 400 may output a test selection screen 420 enabling the user to select different options for testing out the change to the workflow 410. For example, the test selection screen 420 may offer the user the opportunity to wait for the next live triggering event to trigger the modification 412, manually test the modification 412, or test the modification 412 to the workflow 410 using historic data.

Each testing option may be handled by a different processing component such as a program, handler, or the like, within the system. For example, to test the cloned job on the next live triggering event, a live event processing component may be called to trigger a limited run of the cloned job on one or more new/future incoming trigger events. As another example, to test the cloned job on past event data, a past event processing component may be called to trigger a limited run on one or more past events.

When the user selects the option to test the modification 412 to the workflow using previous data, the system then creates a cloned job of the workflow and allows the user to select one or more old events (not shown).

In this example, the workflow application provides the workflow's owner with the capability to simulate the trigger with sample data and kick off a run to make sure the workflow runs, and functions as expected. In case of failure, the owner(s) should be able to quickly fix their errors and retest the workflow. Through the user interface 400, the user can choose to test a triggering event on sample data that the system can automatically process for the user. To implement these changes in a workflow application, various designs may be modified including a client application, a flow RP, logic applications, connectors, as well as policies leveraged by the connectors.

The trigger operations in the connectors that support testing may include a new extension. For example, the extension may include information required by the connector/policy to retrieve meaningful sample data. For some connectors, this could include the operation ID and parameters of a GET operation that produces sample data. For other connectors, this could mean some other hardcoded information. Here is an example of the new extension called 'x-simulate-trigger'.

The system may continue to use the same job types that were used by regular recurrent trigger executions with some differences. For example, for the cloned jobs, the system may ensure that the cloned jobs are completed after a single execution (or a predetermined number of executions) so that they get deleted after a predetermined number of runs. This may be achieved by creating jobs without a repeat strategy in the simulation context. The system may also ensure that the Job Ids are prepended with a tag to help identify them as simulation jobs and not live jobs, and add a header for all outgoing calls when the trigger simulation job is running.

Figure 4B:
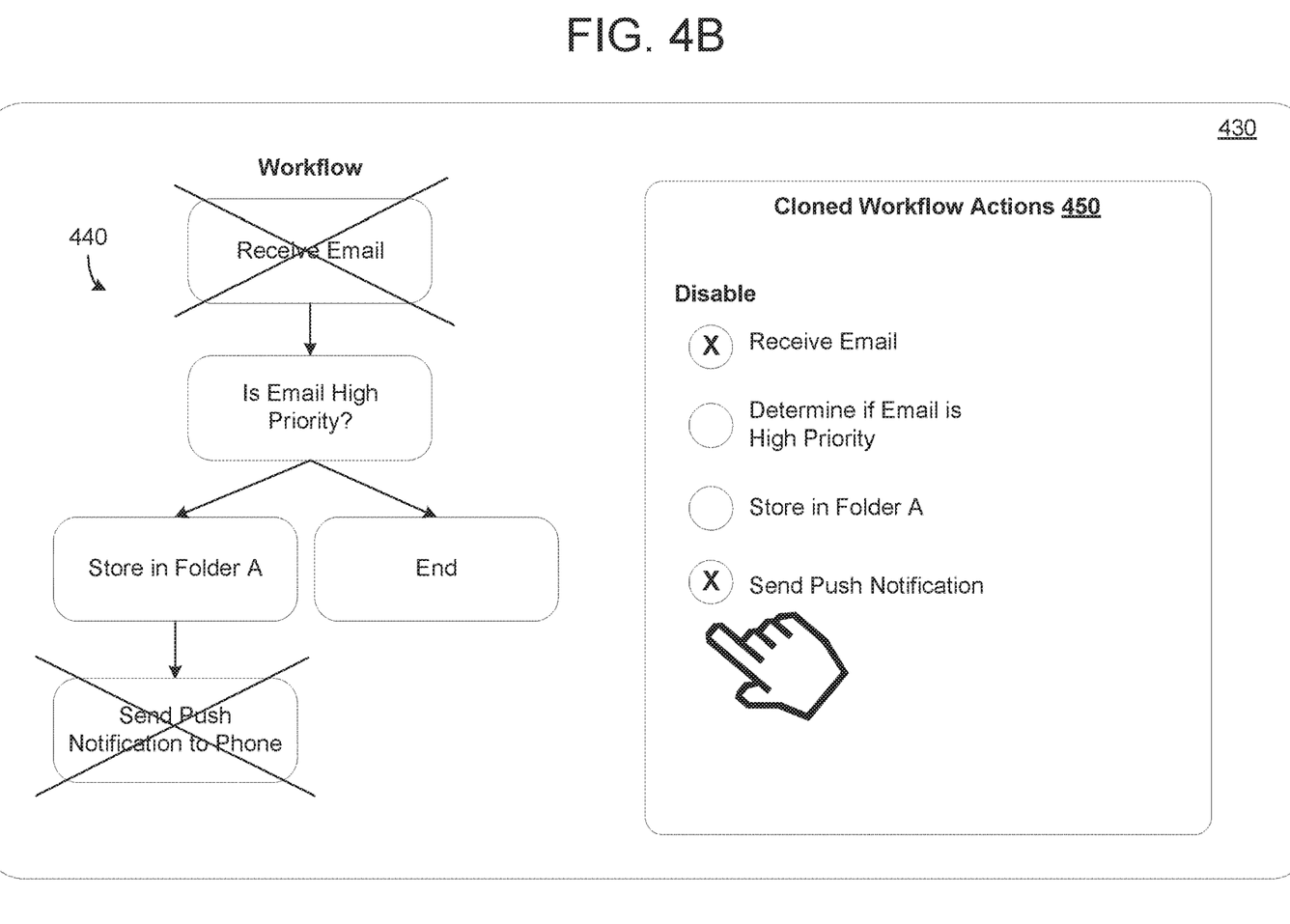
FIG. 4B is a diagram illustrating a user interface for selecting a partial workflow to be tested according to some embodiments.

FIG. 4B illustrates a user interface 430 for selecting a partial workflow to be tested according to some embodiments. Referring to FIG. 4B, the user interface 430 includes a display of the steps of a workflow 440 which includes four actions including receiving an email, determining whether the email is high priority, storing the email in Folder X, and sending a push notification to the user's phone. Here, the workflow 440 represents a workflow that is being tested with a cloned job.

In this example, the user interface 430 provides a window 450 which allows the user to disable or otherwise turn off one or more actions of the workflow 440 thereby enabling a partial workflow or partial run to be performed without testing the entire workflow. This allows the user to test only the features that are new, or that the user desires to test. In this example, the storing of the high priority email in storage is the modification. Furthermore, the user may test the underlying cloned job on old data, instead of a new email. Therefore, the user may disable the trigger action of receiving an email. In addition, the user may disable sending a push notification. This allows the user to focus on only the actions which are new (determine if an email is high priority and storing high priority emails in a certain folder).

Figure 5:
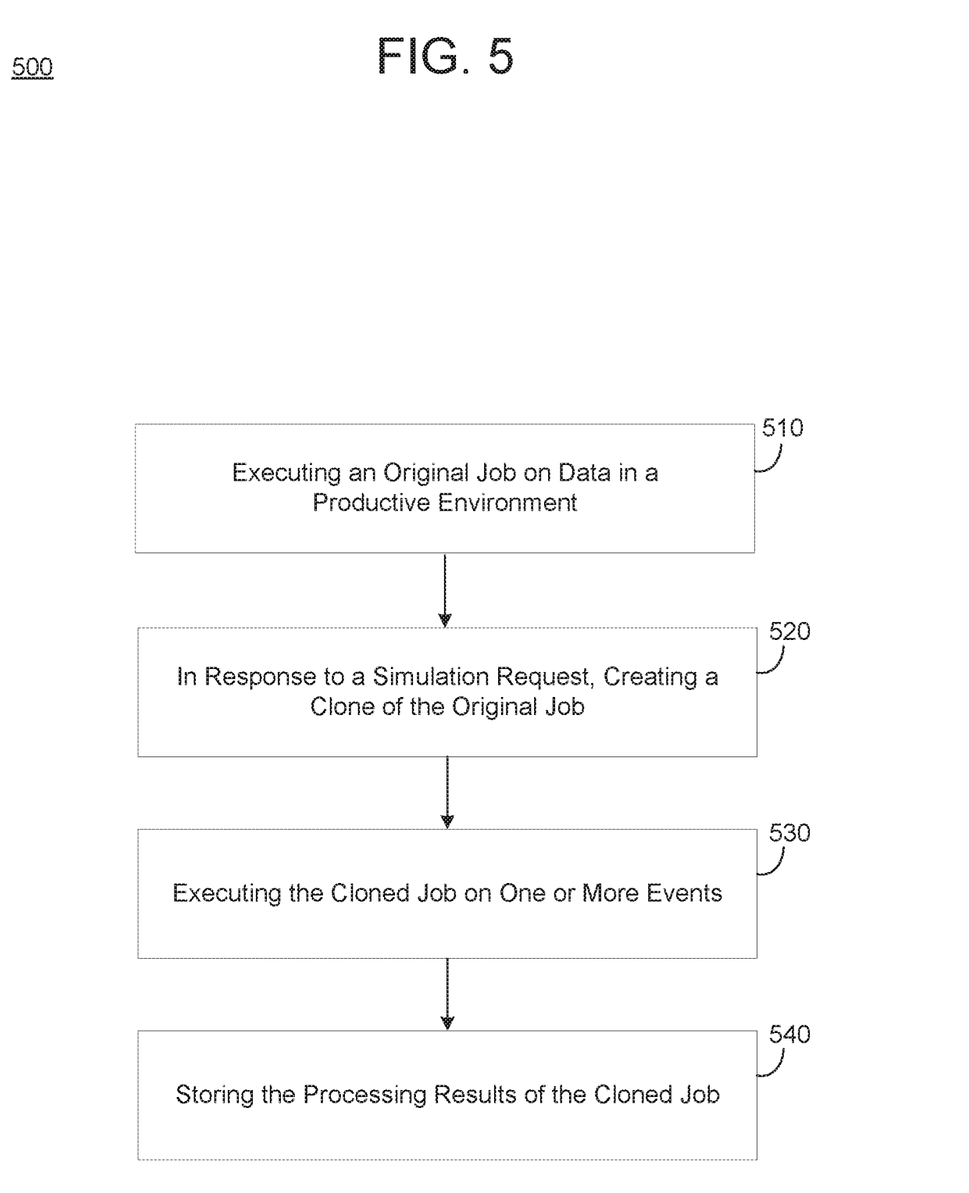
FIG. 5 is a diagram illustrating a method of cloning and executing a parallel job according to some embodiments.

FIG. 5 illustrates a method 500 a method of cloning and executing a parallel job according to some embodiments. For example, a processing unit (e.g., one or more processors, processing cores, processor threads, etc.) of computing device (e.g., mobile device, personal computer, server, etc.) may execute software program code to cause the computing device to perform the method 500. For example, the method 500 and all other methods and processes herein may be embodied in computer-executable program code that may be read from one or more non-transitory computer-readable media, such as a flash drive, a CD-ROM, a DVD-ROM, an external disk, a magnetic tape, or the like, and then stored in a compressed, uncompiled and/or encrypted format.

In some embodiments, hard-wired circuitry may be used instead of, or in combination with program code to implement the methods and processes. Embodiments are not limited to any specific combination of hardware and software. As an example, the method 500 may be performed by a single device such as a computer, or a combination of multiple devices such as multiple computers distributed across a network.

Referring to FIG. 5, in 510, the method 500 may include executing a job on data in a production environment. According to various embodiments, the job may include machine-readable code of a pre-defined flow. In some embodiments, the job may include a collection of application programming interface (API) calls between the workflow application and one or more other applications associated with the workflow such as an email application, a meeting application, and the like. In some embodiments, executing the job may include marking events included in the production data and processed by the job as seen by the job.

In response to receiving a simulation request, in 520 the method 500 may include creating a clone of the job which has an independent execution state from the job. For example, the simulation request may be a user request to test changes made to a workflow and its corresponding job, or the like. The job and the cloned job may each include machine readable code of a pre-defined flow with at least one modification to the pre-defined flow. In the example embodiments, the cloned job may be identical to the original job. Therefore, the cloned job may do exactly the same steps as the original job.

In 530, the method 500 may include executing the cloned job on one or more events, and in 540 the method 500 may include storing the processing results of the cloned job. In some embodiments, executing the cloned job may include executing the cloned job on a past event such as an event that was previously marked as seen by the job, and processing the past event to generate different processing results. As another example, the executing the cloned job may be executed on one or more new/future events that trigger the workflow. In some embodiments, the executing the cloned job may include executing the cloned job just once in the production environment. In some embodiments, the method may further include simultaneously executing the original job on an incoming new event in parallel with the executing of the cloned job on a past event. In some embodiments, the method may further include terminating the cloned job after executing a predetermined number of runs of the cloned job on the one or more past or future events. Here, the limited number of runs may be one run, two runs, or another amount of limited runs.

Figure 6:
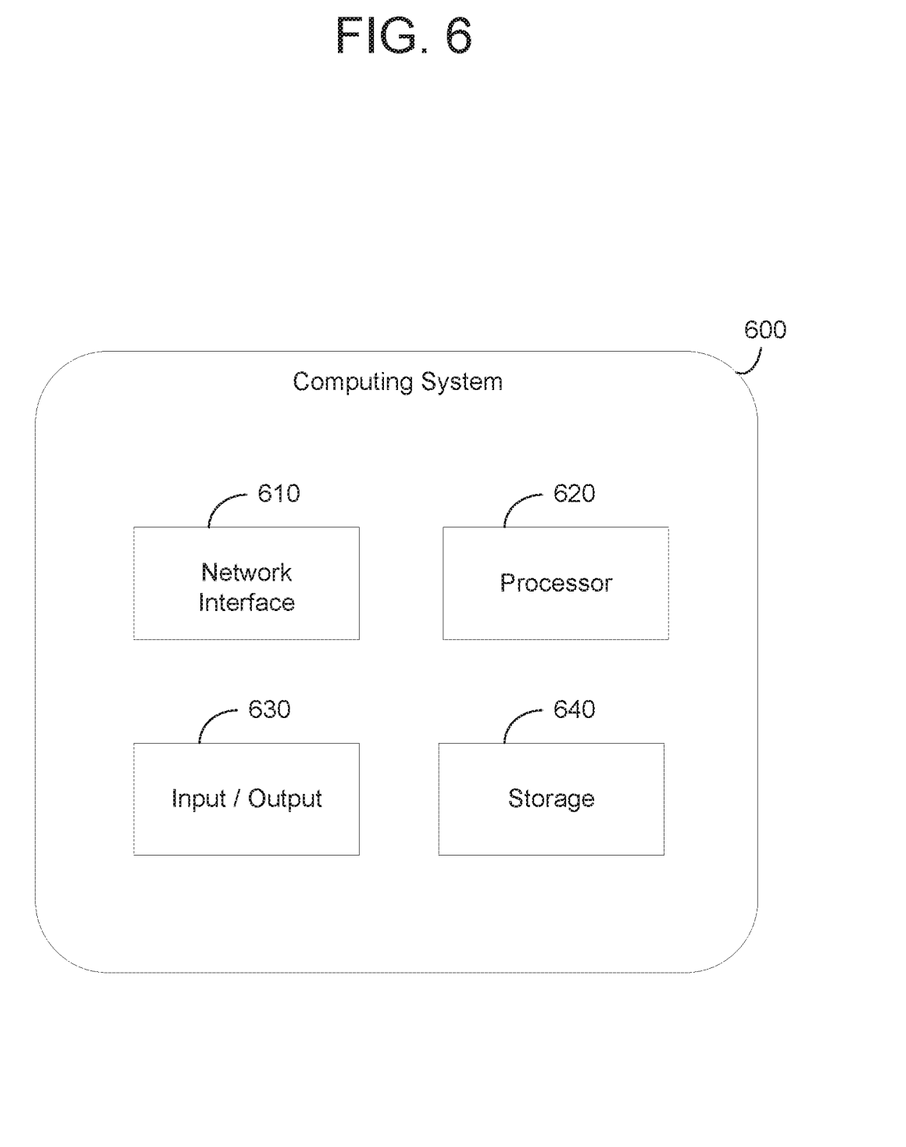
FIG. 6 is a diagram illustrating an example of a computing node architecture according to some embodiments.

FIG. 6 illustrates an example of a computing system 600 according to some embodiments. For example, the computing system 600 may be a server node, a cloud data center, a database, a user device such as mobile phone, tablet, laptop, or the like. In some embodiments, the computing system 600 may be distributed across multiple devices. Referring to FIG. 6, the computing system 600 includes a network interface 610, a processor 620, an input/output 630, and a storage 640. Although not shown in FIG. 6, the computing system 600 may also include or be electronically connected to other components such as a display, a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. In some embodiments, the network interface 610 may transmit data via a cellular network, which may be referred to as a mobile network or voice network. In some embodiments, the network interface 610 may transmit data via a network (e.g., a wired network, a local area network, a secure private network, the Internet, a wireless network, etc.). The processor 620 may include one or more processing devices each including one or more processing cores. In some examples, the processor 620 may be a multicore processor or a plurality of multicore processors. Also, the processor 620 may be fixed or reconfigurable.

The input and the output 630 may include interfaces for inputting data to the computing system 600 and for outputting data from the computing system. For example, data may be output to an embedded or an external display, a storage drive, a printer, and the like. For example, the input and the output 630 may include one or more ports, interfaces, cables, wires, boards, and/or the like, with input/output capabilities. The network interface 610, the output 630, or a combination thereof, may interact with applications executing on other devices.

The storage device 640 is not limited to a particular storage device and may include any known memory device such as RAM, ROM, hard disk, object storage, blob storage, and the like, and may or may not be included within the cloud environment. The storage 640 may include partitions of storage and one or more indexes identifying location of stored objects. The storage 640 may store software modules or other instructions which can be executed by the processor 620 to perform the method 500 shown in FIG. 5.

The processor 620 may execute a job on data in a production environment, where the job comprises machine-readable code of a pre-defined flow. For example, the job may process triggering events in the data based on a pre-defined workflow that is defined through a workflow application. The job represents the machine-readable code of the source code (human generated code) of the workflow. Although not shown in FIG. 6, the processor 620 may include a past event processing component which triggers the cloned workflow to execute a limited number of runs on one or more past events that are stored in a historical DB. As another example, the processor 620 may include a future event processing component which triggers the cloned workflow to execute a limited number of runs one or more incoming new events associated with the trigger.

A user may desire to make changes to a job or otherwise rerun the job on previous data. In doing so, the user may perform a selection on a user interface, or otherwise send a request to simulate the workflow in a test mode, etc. In response, the processor 620 may create a clone of the job which comprises an independent execution state from the job. The clone may include the same steps of the workflow of the original job and may be used to test the job or rerun the job on old data. The processor 620 may execute the cloned job on one or more previous events that were previously processed by the job. In some embodiments, the storage 640 may be configured to store the processing results of the cloned job.

In some embodiments, the processor 620 is configured to simultaneously execute the job on incoming production data in parallel with the execution of the cloned job on the one or more previous events. In some embodiments, the processor 620 may terminate the cloned job after executing a predetermined number of runs of the cloned job on the one or more previous events. In some embodiments, the processor 620 may mark events included in the production data and processed by the job as seen. In some embodiments, the processor 620 may execute the cloned job on an event previously marked as seen by the job, and process the event to generate different processing results. When executing the job, the processor 620 may generate a collection of application programming interface (API) calls. In some embodiments, the processor 620 may be configured to execute the cloned job just once in the production environment.

The above-described diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions.

Embodiments described herein are solely for the purpose of illustration. Those in the art will recognize other embodiments may be practiced with modifications and alterations to that described above.

What is claimed is:

1. A computing system comprising:
   a processor configured to
      execute an original job on newly-received data in a production environment, where the original job comprises machine-readable code of a predefined flow,
      in response to receiving a request to simulate the original job, create a clone of the original job which comprises an independent execution state from the original job, modifying the cloned job, where the modified cloned job is different from the original job; and
      while continuing to execute the original job on newly-received data in the production environment, execute the modified cloned job on historical data in the production environment; and
   a storage configured to store the processing results of execution of the modified cloned job.

2. The computing system of claim 1, wherein the processor is configured to execute the modified cloned job on data in the production environment that is received subsequent to creating the clone of the original job.

3. The computing system of claim 1, wherein the processor is further configured to terminate the modified cloned job after executing a limited number of runs of the modified cloned job.

4. The computing system of claim 1, wherein the modified cloned job comprises the original job with one or more steps of the predefined flow omitted.

5. The computing system of claim 1, wherein the processor is configured to execute the modified cloned job on historical data previously marked as seen by the original job, and process the historical data to generate different processing results.

6. The computing system of claim 1, wherein the original job comprises a collection of application programming interface (API) calls.

7. The computing system of claim 1, wherein the processor is configured to execute the modified cloned job just once in the production environment and terminate the modified cloned job after one execution.

8. A method comprising:
   executing an original job on newly-received data in a production environment, where the original job comprises machine-readable code of a predefined flow;
   in response to receiving a request to simulate the original job, creating a clone of the original job which comprises an independent execution state from the original job;
   modifying the cloned job, where the modified cloned job is different from the original job;
   while continuing to execute the original job on newly-received data in the production environment, executing the modified cloned job on historical data in the production environment; and
   storing processing results of execution of the modified cloned job.

9. The method of claim 8, further comprising executing the modified cloned job on newly-received data in the production environment that is received subsequent to modifying the cloned job.

10. The method of claim 8, further comprising terminating the modified cloned job after executing a limited number of runs of the modified cloned job on the historical data.

11. The method of claim 8, wherein the modified cloned job comprises the original job with one or more steps of the predefined flow omitted.

12. The method of claim 8, wherein the executing the modified cloned job comprises executing the modified cloned job historical data previously marked as seen by the original job, and processing the historical data to generate different processing results.

13. The method of claim 8, wherein the original job comprises a collection of application programming interface (API) calls.

14. The method of claim 8, wherein the executing the modified cloned job comprises executing the modified cloned job just once in the production environment and terminating the modified cloned job after one execution.

15. A computing system comprising:
   a processor configured to create a clone of an active job which comprises machine-readable code corresponding to a predefined flow and to modify the cloned job, where the modified cloned job is different from the active job, where the processor comprises:

a past event processing component configured to trigger the processor to run the modified cloned job on historical data in a production environment while continuing to execute the active job on newly-received data in the production environment; and a storage configured to store processing results of execution of the modified cloned job.

16. The computing system of claim 15, wherein the processor is configured to run the modified cloned job just once and terminate the modified cloned job thereafter.

17. The computing system of claim 15, wherein the modified cloned job comprises the active job with one or more steps from the predefined flow omitted.

18. The computing system of claim 17, further comprising displaying a user interface which enables the user to select the one or more steps of the predefined flow to omit.

* * * * *